(12) United States Patent
Grossman et al.

(10) Patent No.: US 9,053,490 B2
(45) Date of Patent: Jun. 9, 2015

(54) GENERATING READABLE INDICIA CUSTOMIZED FOR PRODUCT INFORMATION

(75) Inventors: Glenn Grossman, Matthews, NC (US); David M. Grigg, Rock Hill, SC (US); Susan Smith Thomas, Gastonia, NC (US); Matthew A. Calman, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 403 days.

(21) Appl. No.: 13/584,325

(22) Filed: Aug. 13, 2012

(65) Prior Publication Data

US 2014/0042218 A1    Feb. 13, 2014

(51) Int. Cl.
*G06F 17/00* (2006.01)
*G06Q 30/02* (2012.01)
*G06Q 30/06* (2012.01)

(52) U.S. Cl.
CPC .......... *G06Q 30/02* (2013.01); *G06Q 30/0601* (2013.01)

(58) Field of Classification Search
CPC ............................ G06Q 30/02; G06K 7/1417
USPC .................... 235/375, 380, 462.09
See application file for complete search history.

(56) References Cited

U.S. PATENT DOCUMENTS

| | | | |
|---|---|---|---|
| 2011/0137742 A1 | 6/2011 | Parikh | |
| 2011/0251892 A1 | 10/2011 | Laracey | |
| 2012/0016731 A1 | 1/2012 | Smith et al. | |
| 2012/0022944 A1 | 1/2012 | Volpi | |
| 2012/0030032 A1 | 2/2012 | Zurada | |
| 2012/0078782 A1 | 3/2012 | Schoenberg et al. | |
| 2012/0096499 A1 | 4/2012 | Dasher et al. | |
| 2013/0290101 A1* | 10/2013 | Arini et al. | 705/14.55 |
| 2013/0339122 A1* | 12/2013 | Truitt et al. | 705/14.26 |

OTHER PUBLICATIONS

QR Code Label. "QR Code label for online product specifications, certificates and manuals." http://www.qrcodelabel.nl/en/qr-code-manual/. Retrieved Nov. 13, 2012. 1 page.

* cited by examiner

*Primary Examiner* — Daniel St. Cyr
(74) *Attorney, Agent, or Firm* — Michael A. Springs; Moore & Van Allen PLLC; Patrick B. Home (57) ABSTRACT

Embodiments of the invention are directed to systems, methods and computer program products for collecting product information based on a navigation history of the user, the product information being associated with the product; generating a readable indicia based on the collected product information, wherein, in response to selection of the readable indicia, the readable indicia is configured to provide instructions for purchasing the product based on the collected product information; and presenting the readable indicia to the user for saving for subsequent consideration or distributing to one or more other users. In some embodiments, shipping information indicative of the user's desired destination address for the product is collected from user input and discount information is collected based on the navigation history of the user or user input. In such cases, the readable indicia may be generated based on all of the product information, the shipping information and the discount information.

21 Claims, 3 Drawing Sheets

GENERATING READABLE INDICIA CUSTOMIZED FOR PRODUCT INFORMATION

BACKGROUND

In some instances, when an Internet browser navigates multiple website pages, the combination of page visits authorizes the user to discounts for purchasing a product. Such discounts, however, are typically lost when the user navigates away from the product purchase page.

BRIEF SUMMARY

Embodiments of the invention are directed to systems, methods and computer program products for processing a readable indicia associated with an advertisement associated with a product.

According to some embodiments, an apparatus, includes a memory; a processor; and a computing module stored in the memory, executable by the processor, and configured to cause the processor to collect product information based on a navigation history of the user, the product information being associated with the product; generate a readable indicia based on the collected product information, wherein, in response to selection of the readable indicia, the readable indicia is configured to provide instructions for purchasing the product based on the collected product information; and present the readable indicia to the user for saving for subsequent consideration or distributing to one or more other users.

In some embodiments, the readable indicia comprises a Quick Response (QR) code. In some embodiments, the computing module is further configured to cause the processor to collect shipping information from user input, the shipping information being indicative of the user's desired destination address for the product in the event the product is purchased by selection of the readable indicia; wherein generating the readable indicia is further based on the collected shipping information; and wherein, in response to selection of the readable indicia, the readable indicia is configured to provide instructions for shipping the product based on the collected shipping information.

In some embodiments, the computing module is further configured to cause the processor to collect discount information based on the navigation history of the user or user input, the discount information indicative of one or more discounts to a regular price of the product; wherein generating the readable indicia is further based on the collected discount information; and wherein, in response to selection of the readable indicia, the readable indicia is configured to provide instructions for purchasing the product including the one or more discounts to the regular price of the product based on the collected discount information. In some such embodiments, the discount information is collected based at least in part on the navigation history of the user; and wherein at least one of the one or more discounts were made available to the user based on the user's navigation to one or more website pages associated with the product.

In some embodiments, the computing module is further configured to cause the processor to populate the readable indicia in an electronic wishlist or electronic cart for subsequent consideration for purchase. In some such embodiments, the computing module is further configured to cause the processor to, in response to selection of the readable indicia, remove the readable indicia from the electronic wishlist or electronic cart.

In some embodiments, the computing module is further configured to cause the processor to generate two or more readable indicia based on the collected product information, wherein at least two of the readable indicia are generated to indicate one or more variations in product selection; and present the two or more readable indicia to one or more contacts associated with the user.

According to embodiments of the invention, a method for generating a readable indicia associated with a product under consideration by a user includes providing a processor for executing computer program code stored in a non-transitory computer-readable medium to cause the processor to collect product information based on a navigation history of the user, the product information being associated with the product; generate a readable indicia based on the collected product information, wherein, in response to selection of the readable indicia, the readable indicia is configured to provide instructions for purchasing the product based on the collected product information; and present the readable indicia to the user for saving for subsequent consideration or distributing to one or more other users.

In some embodiments, the readable indicia comprises a Quick Response (QR) code. In some embodiments, the computer program code is further to cause the processor to collect shipping information from user input, the shipping information being indicative of the user's desired destination address for the product in the event the product is purchased by selection of the readable indicia; wherein generating the readable indicia is further based on the collected shipping information; and wherein, in response to selection of the readable indicia, the readable indicia is configured to provide instructions for shipping the product based on the collected shipping information.

In some embodiments, the computer program code is further to cause the processor to collect discount information based on the navigation history of the user or user input, the discount information indicative of one or more discounts to a regular price of the product; wherein generating the readable indicia is further based on the collected discount information; and wherein, in response to selection of the readable indicia, the readable indicia is configured to provide instructions for purchasing the product including the one or more discounts to the regular price of the product based on the collected discount information. In some such embodiments, the discount information is collected based at least in part on the navigation history of the user; and wherein at least one of the one or more discounts were made available to the user based on the user's navigation to one or more website pages associated with the product.

In some embodiments, the computer program code is further to cause the processor to populate the readable indicia in an electronic wishlist or electronic cart for subsequent consideration for purchase. In some such embodiments, the computer program code is further to cause the processor to, in response to selection of the readable indicia, remove the readable indicia from the electronic wishlist or electronic cart.

In some embodiments, the computer program code is further to cause the processor to generate two or more readable indicia based on the collected product information, wherein at least two of the readable indicia are generated to indicate one or more variations in product selection; and present the two or more readable indicia to one or more contacts associated with the user.

According to embodiments of the invention, a computer program product for processing readable indicia for a payment claim includes a non-transitory computer-readable medium comprising a set of codes for causing a computer to collect product information based on a navigation history of the user, the product information being associated with the product; generate a readable indicia based on the collected product information, wherein, in response to selection of the readable indicia, the readable indicia is configured to provide instructions for purchasing the product based on the collected product information; and present the readable indicia to the user for saving for subsequent consideration or distributing to one or more other users.

In some embodiments, the readable indicia comprises a Quick Response (QR) code. In some embodiments, the set of codes is further to cause the computer to collect shipping information from user input, the shipping information being indicative of the user's desired destination address for the product in the event the product is purchased by selection of the readable indicia; wherein generating the readable indicia is further based on the collected shipping information; and wherein, in response to selection of the readable indicia, the readable indicia is configured to provide instructions for shipping the product based on the collected shipping information.

In some embodiments, the set of codes is further to cause the computer to collect discount information based on the navigation history of the user or user input, the discount information indicative of one or more discounts to a regular price of the product; wherein generating the readable indicia is further based on the collected discount information; and wherein, in response to selection of the readable indicia, the readable indicia is configured to provide instructions for purchasing the product including the one or more discounts to the regular price of the product based on the collected discount information. In some such embodiments, the discount information is collected based at least in part on the navigation history of the user; and wherein at least one of the one or more discounts were made available to the user based on the user's navigation to one or more website pages associated with the product.

In some embodiments, the set of codes is further to cause the computer to populate the readable indicia in an electronic wishlist or electronic cart for subsequent consideration for purchase. In some such embodiments, the set of codes is further to cause the computer to, in response to selection of the readable indicia, remove the readable indicia from the electronic wishlist or electronic cart.

In some embodiments, the set of codes is further to cause the computer to generate two or more readable indicia based on the collected product information, wherein at least two of the readable indicia are generated to indicate one or more variations in product selection; and present the two or more readable indicia to one or more contacts associated with the user.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for generating readable indicia associated with a product. The invention includes collecting product information based on a navigation history of the user, the product information being associated with the product; generating a readable indicia based on the collected product information, wherein, in response to selection of the readable indicia, the readable indicia is configured to provide instructions for purchasing the product based on the collected product information; and presenting the readable indicia to the user for saving for subsequent consideration or distributing to one or more other users. In some embodiments, shipping information indicative of the user's desired destination address for the product is collected from user input and discount information is collected based on the navigation history of the user or user input. In such cases, the readable indicia may be generated based on all of the product information, the shipping information and the discount information. A product, as used herein, refers to services and/or goods offered for sale.

As used herein, the readable indicia typically includes a code (e.g., a one dimensional code such as a barcode, a two dimensional code such as a Quick Response (QR) code, etc.). In some embodiments, the readable indicia includes visual indicia, e.g., a barcode, a Quick Response (QR) code, etc. The readable indicia may include any one-dimensional or two-dimensional code. The invention is not limited to the merchant being an insurance entity. In embodiments where the readable indicia is in electronic form, the readable indicia may be dynamically generated after the user selects an option to view the readable indicia (e.g., on the user's portable mobile communication device). The readable indicia may comprise any indicia, visual or non-visual, where information associated with the indicia is receivable or readable (e.g., scannable) by the mobile device. For example, the readable indicia is comprised in a tag (e.g., radio frequency identification (RFID) tag, near field communication (NFC) tag, etc.).

Once a readable indicia has been generated according to the method discussed herein, a user may use a portable mobile communication device or apparatus ("mobile device") that may include an image-capturing component (e.g., a camera) to capture the image of the readable indicia, which may then instruct the user's device to purchase the product associated with the readable indicia in accordance with the previously made product selections and any shipping or discount information. In some embodiments, image of the readable indicia is stored in the mobile device. In other embodiments, the image of the readable indicia is automatically transmitted to an external server. In some embodiments, a user may bring a mobile device in close proximity to a readable indicia having a tag in order to receive information (e.g., readable indicia) associated with the tag.

Figure 1:
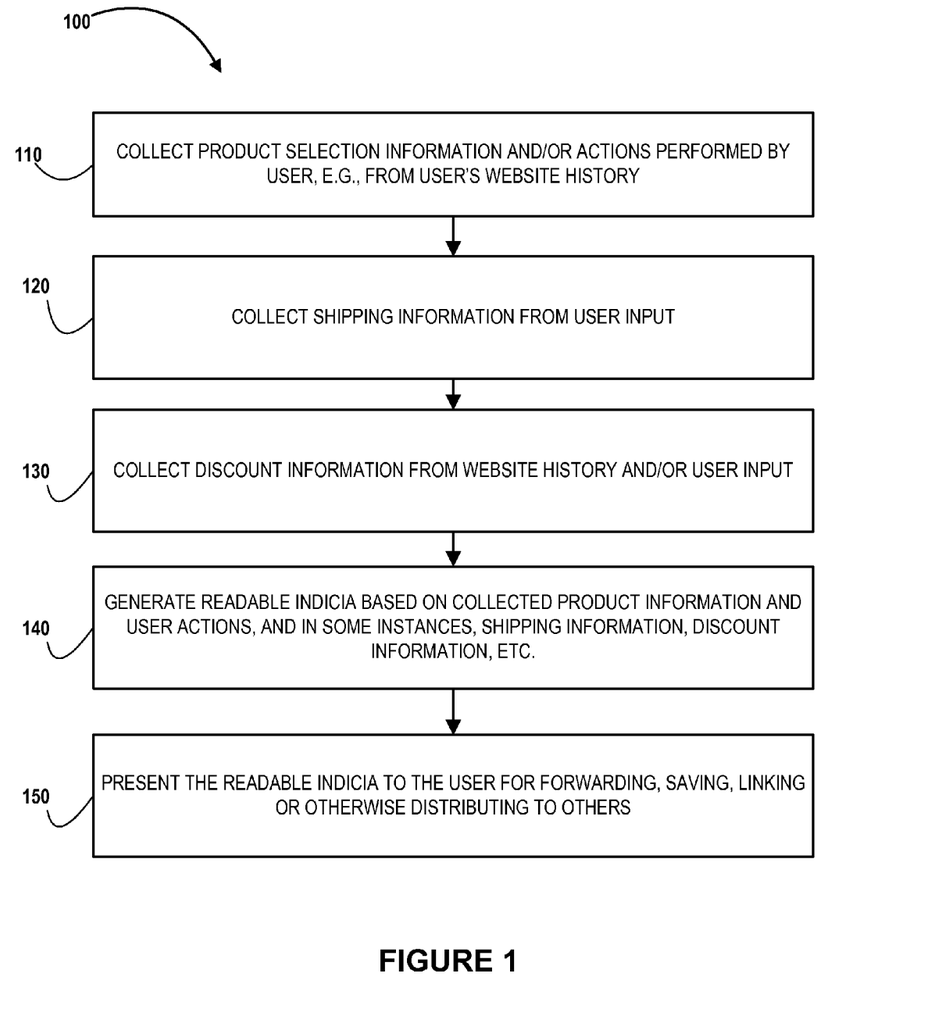
FIG. 1 is a flowchart illustrating a general process flow for generating a readable indicia associated with a product in accordance with embodiments of the present invention.

Referring now to FIG. 1, a general process flow 100 is provided for generating a readable indicia associated with a product. At block 110, product selection information is collected from a user's website history or otherwise. For example, as the user navigates through various websites, the user may accumulate opportunities for discounts or other rewards associated the purchase of products. The user may, for example, navigate through a website that provides discounts for a variety of products if the user enters a merchant's website through the discount website. The user may then purchase the product at a discount to the normal price. However, in some instances, if the user navigates directly to the merchant's website to purchase the product, the discount offered due to the user navigating through the discount website to the merchant's website is unavailable. A data collection tool or module may capture the user's website history or otherwise track the user's interactions over the Internet, such as by recording the websites visited, the links chosen, etc. in order to obtain certain discounts on product purchases. In some embodiments, as a user navigates through a merchant's website and makes selections regarding a product, for example, characteristics of a product such as size, color, model and the like, the data collection tool tracks these selections for inclusion in one or more readable indicia to be generated.

At block 120, shipping information may be collected from user input. The shipping information may be entered by the user into the merchant's website and then collected by the data collection tool or may be entered directly into an application for generating the readable indicia. For example, once the user has navigated to the merchant's checkout page and, therefore, has already made product selections such as type of product, color, number and the like, the user may be prompted to enter shipping information. This information may be the user's personal or business address. In various instances, the user may enter the shipping information into the readable indicia application so that the readable indicia may subsequently be used by a contact of the user to purchase the product and have the product shipped to the user's address.

At block 130, discount information may be collected from the user's website or Internet browsing history, user input or otherwise, such as by tracking the user's navigation through the Internet using a data collection tool. The discount information, in some embodiments, may represent one or more discount associated with the product. The discounts, as discussed above, may be achieved by the user navigating in a particular pattern through the Internet to the merchant's product page, such as a checkout page. The discount(s) may be applied to the product based on the user's Internet activity and/or may be discounts entered by the user manually, such as by keying in a special discount code for purchasing the product or redeeming some type of reward with the merchant and/or the administrator of the readable indicia generation system. For example, the user may not only receive a discount for navigating through a discount website to the merchant website, but the user may also receive a discount from a coupon obtained elsewhere online, via print media or electronic media or the like.

At block 140, readable indicia is generated based on one or more of the collected product information, the shipping information and/or the discount information. The readable indicia may include instructions for causing a processor to purchase the product automatically or assist another user in purchasing the product under the same circumstances and details based on the selections made by the user and including shipping the product to the address input by the user and/or including purchasing the product under the same discounts that the user had achieved through the user's website navigation activities.

At block 150, the readable indicia, once generated, may be presented to the user for saving or distributing to other users, such as the user's contacts. The user may forward the readable indicia or provide a link to the readable indicia or otherwise make it available for others to select the readable indicia. For example, the readable indicia generator may make the readable indicia available to the user for electronic forwarding via email, text message, social media messaging or the like or the readable indicia may be incorporated into a user's webpage or social media page for inclusion on a list as discussed further below.

Figure 2:
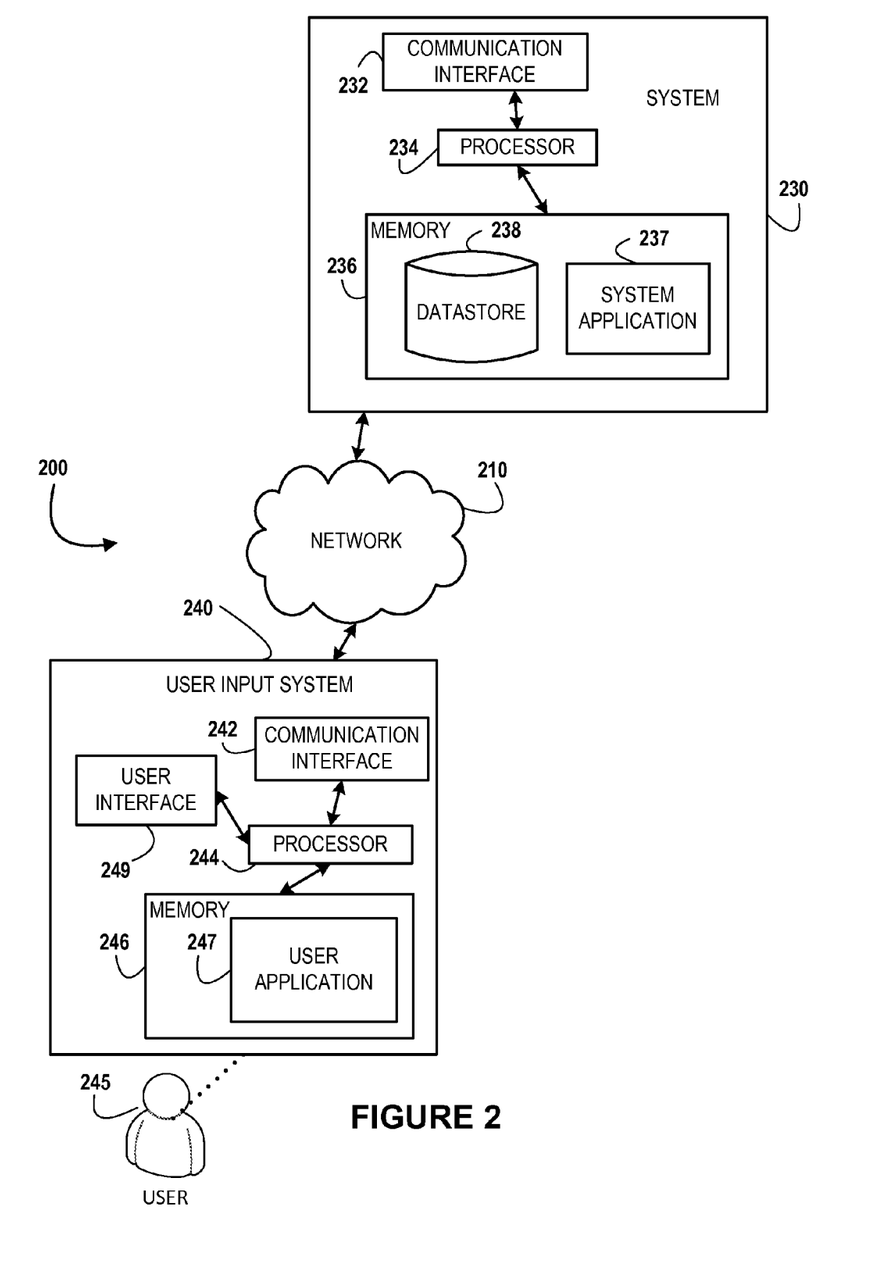
FIG. 2 is a block diagram illustrating technical components of a system for processing a readable indicia associated with an advertisement associated with a product in accordance with embodiments of the present invention.

Referring now to FIG. 2, an exemplary block diagram of the system environment 200 for implementing the process flow 100 described in FIG. 1 (and/or the other process flows described herein) is shown, in accordance with embodiments of the invention. As illustrated, the system environment 200 includes a network 210, a system 230, and a user input system 240. Also shown in FIG. 2 is a user 245 of the user input system 240. The user input system 240 may be a mobile device as described herein. The user 245 may be a person who uses the user input system 240 to execute a user application 247. The system 230 may be the external server described herein. The user application 247 and/or the system application 237 may incorporate one or more parts of the process flow 100 or any other function described herein.

As shown in FIG. 2, the system 230, and the user input system 240 are each operatively and selectively connected to the network 210, which may include one or more separate networks. In addition, the network 210 may include a local area network (LAN), a wide area network (WAN), and/or a global area network (GAN), such as the Internet. The network may also include a mobile telecommunication network. It will also be understood that some or all the network 210 may be secure and/or unsecure and may also include wireless and/or wireline and/or optical interconnection technology.

The user input system 240 may include any computerized apparatus that can be configured to perform any one or more of the functions of the user input system 240 described and/or contemplated herein. For example, the user 245 may use the user input system 240 to transmit and/or receive information or commands to and from the system 230. In some embodiments, for example, the user input system 240 may include a personal computer system, a mobile computing device, a personal digital assistant, a mobile phone, a network device, and/or the like. As illustrated in FIG. 2, in accordance with some embodiments of the present invention, the user input system 240 includes a communication interface 242, a processor 244, a memory 246 having an user application 247 stored therein, and a user interface 249. In such embodiments, the communication interface 242 is operatively and selectively connected to the processor 244, which is operatively and selectively connected to the user interface 249 and the memory 246. In some embodiments, the user 245 may use the user application 247 to execute processes described with respect to the process flows described herein.

Each communication interface described herein, including the communication interface 242, generally includes hardware, and, in some instances, software, that enables the user input system 240, to transport, send, receive, and/or otherwise communicate information to and/or from the communication interface of one or more other systems on the network 210. For example, the communication interface 242 of the user input system 240 may include a wireless transceiver, modem, server, electrical connection, and/or other electronic device that operatively connects the user input system 240 to another system such as the system 230. The wireless transceiver may include a radio circuit to enable wireless transmission and reception of information.

Each processor described herein, including the processor 244, generally includes circuitry for implementing the audio, visual, and/or logic functions of the user input system 240. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 247 of the memory 246 of the user input system 240.

Each memory device described herein, including the memory 246 for storing the user application 247 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 2, the memory 246 includes the user application 247. In some embodiments, the user application 247 includes an interface for communicating with, navigating, controlling, configuring, and/or using the user input system 240. In some embodiments, the user application 247 includes computer-executable program code portions for instructing the processor 244 to perform one or more of the functions of the user application 247 described and/or contemplated herein. In some embodiments, the user application 247 may include and/or use one or more network and/or system communication protocols.

Also shown in FIG. 2 is the user interface 249. In some embodiments, the user interface 249 includes one or more output devices, such as a display and/or speaker, for presenting information to the user 245. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 245. In some embodiments, the user interface 249 includes the input and display devices of a mobile device, which are operable to receive and display information.

FIG. 2 also illustrates a system 230, in accordance with an embodiment of the present invention. The system 230 may include any computerized apparatus that can be configured to perform any one or more of the functions of the system 230 described and/or contemplated herein. In accordance with some embodiments, for example, the system 230 may include a computer network, an engine, a platform, a server, a database system, a front end system, a back end system (such as one or more servers maintained by a financial institution), a personal computer system, and/or the like. Therefore, the system 230 may be an external server as described herein. In some embodiments, such as the one illustrated in FIG. 2, the system 230 includes a communication interface 232, a processor 234, and a memory 236, which includes a system application 237 and a datastore 238 stored therein. As shown, the communication interface 232 is operatively and selectively connected to the processor 234, which is operatively and selectively connected to the memory 236.

It will be understood that the system application 237 may be configured to implement any one or more portions of the various user interfaces and/or process flow described herein. The system application 237 may interact with the user application 247. It will also be understood that, in some embodiments, the memory includes other applications. It will also be understood that, in some embodiments, the system application 237 is configured to communicate with the datastore 238, the user input system 240, etc.

It will be further understood that, in some embodiments, the system application 237 includes computer-executable program code portions for instructing the processor 234 to perform any one or more of the functions of the system application 237 described and/or contemplated herein. In some embodiments, the system application 237 may include and/or use one or more network and/or system communication protocols.

In addition to the system application 237, the memory 236 also includes the datastore 238. As used herein, the datastore 238 may be one or more distinct and/or remote datastores. In some embodiments, the datastore 238 is not located within the system and is instead located remotely from the system. In some embodiments, the datastore 238 stores information or data described herein.

It will be understood that the datastore 238 may include any one or more storage devices, including, but not limited to, datastores, databases, and/or any of the other storage devices typically associated with a computer system. It will also be understood that the datastore 238 may store information in any known way, such as, for example, by using one or more computer codes and/or languages, alphanumeric character strings, data sets, figures, tables, charts, links, documents, and/or the like. Further, in some embodiments, the datastore 238 may include information associated with one or more applications, such as, for example, the system application 237. It will also be understood that, in some embodiments, the datastore 238 provides a substantially real-time representation of the information stored therein, so that, for example, when the processor 234 accesses the datastore 238, the information stored therein is current or substantially current.

It will be understood that the embodiment of the system environment illustrated in FIG. 2 is exemplary and that other embodiments may vary. As another example, in some embodiments, the system 230 includes more, less, or different components. As another example, in some embodiments, some or all of the portions of the system environment 200 may be combined into a single portion. Likewise, in some embodiments, some or all of the portions of the system 230 may be separated into two or more distinct portions.

In addition, the various portions of the system environment 200 may be maintained for and/or by the same or separate parties. It will also be understood that the system 230 may include and/or implement any embodiment of the present invention described and/or contemplated herein. For example, in some embodiments, the system 230 is configured to implement any one or more of the embodiments of the process flow 100 described and/or contemplated herein in connection with FIG. 1 or any other process flow described herein. Additionally, the system 230 is configured to initiate presentation of any of the user interfaces described herein. As another example, the system 230 may represent one or more financial institutions and/or one or more financial institution systems and/or servers. In some embodiments, one financial institution communicates with another financial institution across the network 210 and/or some other network or networks, for example, in order to process transactions such as payments for products.

Figure 3:
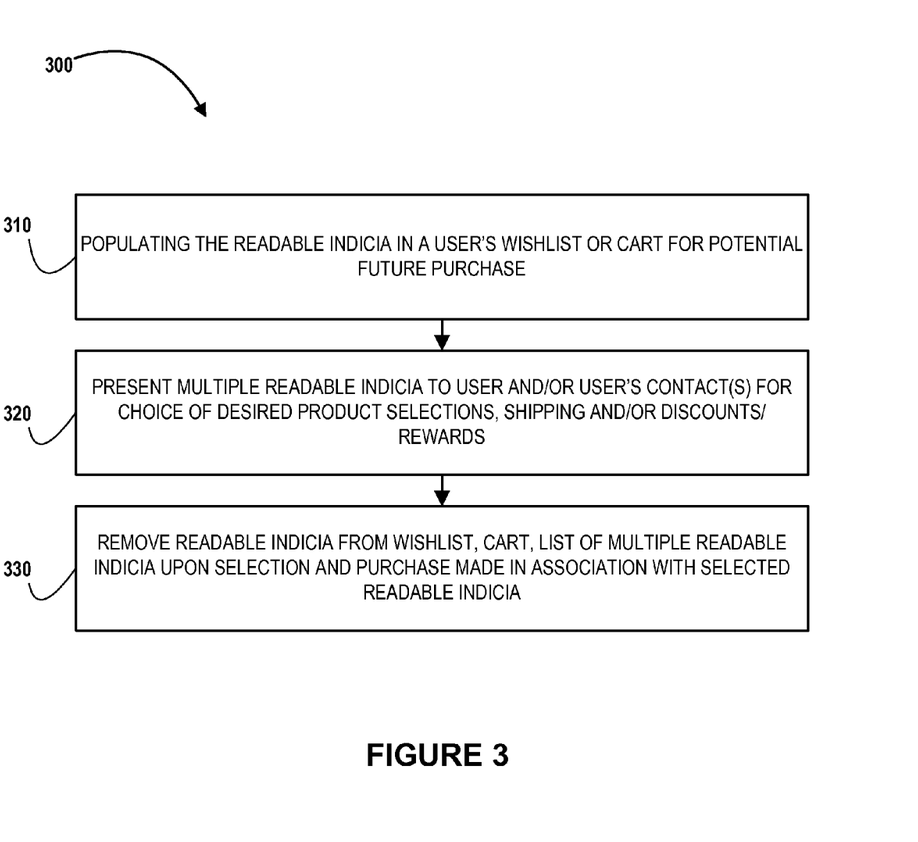
FIG. 3 is a flowchart illustrating a general process flow for generating a readable indicia associated with a product in accordance with embodiments of the present invention.

Referring now to FIG. 3, a general process flow 300 is provided for generating a readable indicia associated with a product including several additional, optional steps to method 100 of FIG. 1. At block 310, the readable indicia may be populated into a user's wishlist, cart, notes, calendar, tasks, to-do list, budget or otherwise for potential future purchase. For example, once the readable indicia has been generated (see step 140), it may be inserted into a user's wishlist. In some embodiments, a user's contacts or some subset of the user's contacts may be granted access to a user's wishlist so that they may purchase a gift for the user. One specific example may be a gift registry such as a wedding gift registry or a baby gift registry that is populated with multiple readable indicia for purchasing products wanted by the user.

At block 320, multiple readable indicia may be presented to the user and/or the user's contacts as described above, so that the user and/or contacts may make a choice of desired product selections, shipping, and/or discounts/rewards associated with the products presented via readable indicia. In some examples, each of the presented readable indicia may be machine readable indicia and may also include corresponding textual, graphical or other human-readable indicia that associates the readable indicia with one or more products available for purchase. In some embodiments, when a user selects a readable indicia, the user's mobile device that captures an image of the readable indicia may then automatically purchase the product associated with the readable indicia, such as by using the user's mobile wallet contained in the mobile device, and including any discounts that were incorporated into the instructions contained within the readable indicia. The product may be shipped to an address specified by the readable indicia, such as an address entered by the user when making the readable indicia using a readable indicia generating application.

At block 330, the readable indicia may be removed from a list, such as a wishlist, in response to the readable indicia being selected by a user and the product being purchased. This provides the advantage of any subsequent user visiting the wishlist peace of mind that they are not duplicating a purchase that has already been made by another user.

In various embodiments, the readable indicia may include instructions for navigating the user to a checkout page that incorporates all of the selections, discounts, and/or shipping information that was established previously by the user. Thus, the readable indicia may provide the user or the user's contacts an opportunity to purchase a product with the given specifications immediately and/or may provide the user or the user's contacts an opportunity to navigate to a confirmation or checkout page for entering payment information or the like in order to purchase the product having the previously established specifications. In various embodiments, multiple readable indicia may be provided to the user and/or the user's contacts that are associated with a similar or the same product but having slightly or significantly distinct selections regarding the product. For example, multiple readable indicia for automatically using a mobile wallet for purchasing the product having different colors may be provided. As another example, in some instances, multiple readable indicia may be provided to the user or the user's contacts that include instructions for immediate or automatic purchase, such as using a mobile wallet, instructions for navigating to additional information regarding the product, instructions for populating the readable indicia or storing the readable indicia for automatic purchase (such as in a wishlist or cart), or various other readable indicia associated with the product or product replacements or supplements.

In summary, some embodiments of the invention are directed to systems, methods and computer program products for generating readable indicia associated with a product. The invention includes collecting product information based on a navigation history of the user, the product information being associated with the product; generating a readable indicia based on the collected product information, wherein, in response to selection of the readable indicia, the readable indicia is configured to provide instructions for purchasing the product based on the collected product information; and presenting the readable indicia to the user for saving for subsequent consideration or distributing to one or more other users. In some embodiments, shipping information indicative of the user's desired destination address for the product is collected from user input and discount information is collected based on the navigation history of the user or user input. In such cases, the readable indicia may be generated based on all of the product information, the shipping information and the discount information.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for generating a readable indicia associated with a product under consideration by a user, the apparatus comprising:

a memory;

a processor; and a computing module stored in the memory, executable by the processor, and configured to cause the processor to:
collect product information based on a navigation history of the user, the product information being associated with the product;
collect shipping information from user input, the shipping information being indicative of the user's desired destination address for the product in the event the product is purchased by selection of the readable indicia;
generate a readable indicia based on the collected product information and the collected shipping information, wherein, in response to selection of the readable indicia, the readable indicia is configured to provide instructions for purchasing the product based on the collected product information and instructions for shipping the product based on the collected shipping information; and
present the readable indicia to the user for saving for subsequent consideration or distributing to one or more other users.

2. The apparatus of claim 1, wherein the readable indicia comprises a Quick Response (QR) code.

3. The apparatus of claim 1, wherein the computing module is further configured to cause the processor to:
collect discount information based on the navigation history of the user or user input, the discount information indicative of one or more discounts to a regular price of the product;
wherein generating the readable indicia is further based on the collected discount information; and
wherein, in response to selection of the readable indicia, the readable indicia is configured to provide instructions for purchasing the product including the one or more discounts to the regular price of the product based on the collected discount information.

4. The apparatus of claim 3, wherein the discount information is collected based at least in part on the navigation history of the user; and wherein at least one of the one or more discounts were made available to the user based on the user's navigation to one or more website pages associated with the product.

5. The apparatus of claim 1, wherein the computing module is further configured to cause the processor to:
    populate the readable indicia in an electronic wishlist or electronic cart for subsequent consideration for purchase.

6. The apparatus of claim 5, wherein the computing module is further configured to cause the processor to:
    in response to selection of the readable indicia, remove the readable indicia from the electronic wishlist or electronic cart.

7. The apparatus of claim 1, wherein the computing module is further configured to cause the processor to:
    generate two or more readable indicia based on the collected product information, wherein at least two of the readable indicia are generated to indicate one or more variations in product selection; and
    present the two or more readable indicia to one or more contacts associated with the user.

8. A method for generating a readable indicia associated with a product under consideration by a user, the method comprising:
    providing a processor for executing computer program code stored in a non-transitory computer-readable medium to cause the processor to:
        collect product information based on a navigation history of the user, the product information being associated with the product;
        collect shipping information from user input, the shipping information being indicative of the user's desired destination address for the product in the event the product is purchased by selection of the readable indicia;
        generate a readable indicia based on the collected product information and the collected shipping information, wherein, in response to selection of the readable indicia, the readable indicia is configured to provide instructions for purchasing the product based on the collected product information and instructions for shipping the product based on the collected shipping information; and
        present the readable indicia to the user for saving for subsequent consideration or distributing to one or more other users.

9. The method of claim 8, wherein the readable indicia comprises a Quick Response (QR) code.

10. The method of claim 8, wherein the computer program code is further to cause the processor to:
    collect discount information based on the navigation history of the user or user input, the discount information indicative of one or more discounts to a regular price of the product;
    wherein generating the readable indicia is further based on the collected discount information; and
    wherein, in response to selection of the readable indicia, the readable indicia is configured to provide instructions for purchasing the product including the one or more discounts to the regular price of the product based on the collected discount information.

11. The method of claim 10, wherein the discount information is collected based at least in part on the navigation history of the user; and wherein at least one of the one or more discounts were made available to the user based on the user's navigation to one or more website pages associated with the product.

12. The method of claim 8, wherein the computer program code is further to cause the processor to:
    populate the readable indicia in an electronic wishlist or electronic cart for subsequent consideration for purchase.

13. The method of claim 12, wherein the computer program code is further to cause the processor to:
    in response to selection of the readable indicia, remove the readable indicia from the electronic wishlist or electronic cart.

14. The method of claim 8, wherein the computer program code is further to cause the processor to:
    generate two or more readable indicia based on the collected product information, wherein at least two of the readable indicia are generated to indicate one or more variations in product selection; and
    present the two or more readable indicia to one or more contacts associated with the user.

15. A computer program product for processing readable indicia for a payment claim, the computer program product comprising:
    a non-transitory computer-readable medium comprising a set of codes for causing a computer to:
        collect product information based on a navigation history of the user, the product information being associated with the product;
        collect shipping information from user input, the shipping information being indicative of the user's desired destination address for the product in the event the product is purchased by selection of the readable indicia;
        generate a readable indicia based on the collected product information and the collected shipping information, wherein, in response to selection of the readable indicia, the readable indicia is configured to provide instructions for purchasing the product based on the collected product information and instructions for shipping the product based on the collected shipping information; and
        present the readable indicia to the user for saving for subsequent consideration or distributing to one or more other users.

16. The computer program product of claim 15, wherein the readable indicia comprises a Quick Response (QR) code.

17. The computer program product of claim 15, wherein the set of codes is further to cause the computer to:
    collect discount information based on the navigation history of the user or user input, the discount information indicative of one or more discounts to a regular price of the product;
    wherein generating the readable indicia is further based on the collected discount information; and
    wherein, in response to selection of the readable indicia, the readable indicia is configured to provide instructions for purchasing the product including the one or more discounts to the regular price of the product based on the collected discount information.

18. The computer program product of claim 17, wherein the discount information is collected based at least in part on the navigation history of the user; and wherein at least one of the one or more discounts were made available to the user based on the user's navigation to one or more website pages associated with the product.

19. The computer program product of claim 15, wherein the set of codes is further to cause the computer to:
populate the readable indicia in an electronic wishlist or electronic cart for subsequent consideration for purchase.

20. The computer program product of claim 19, wherein the set of codes is further to cause the computer to:
in response to selection of the readable indicia, remove the readable indicia from the electronic wishlist or electronic cart.

21. The computer program product of claim 15, wherein the set of codes is further to cause the computer to:
generate two or more readable indicia based on the collected product information, wherein at least two of the readable indicia are generated to indicate one or more variations in product selection; and
present the two or more readable indicia to one or more contacts associated with the user.

\* \* \* \* \*